United States Patent
Zhu et al.

(10) Patent No.: US 8,553,869 B2
(45) Date of Patent: Oct. 8, 2013

(54) METHOD FOR IMPLEMENTING RBT INTERWORKING, MEDIA GATEWAY CONTROL FUNCTION DEVICE, AND APPLICATION SERVER

(75) Inventors: Haopeng Zhu, Shenzhen (CN); Jianmin Liu, Shenzhen (CN); Yichu Zheng, Shenzhen (CN); Yu Sun, Shenzhen (CN); Haoyu Wang, Shenzhen (CN); Lingyan Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 452 days.

(21) Appl. No.: 12/622,631

(22) Filed: Nov. 20, 2009

(65) Prior Publication Data

US 2010/0066801 A1 Mar. 18, 2010

Related U.S. Application Data

(63) Continuation of application No. PCT/CN2008/072617, filed on Oct. 8, 2008.

(30) Foreign Application Priority Data

Oct. 12, 2007 (CN) .......................... 2007 1 0163578

(51) Int. Cl.
*H04M 3/00* (2006.01)
*H04M 5/00* (2006.01)
*H04M 7/14* (2006.01)

(52) U.S. Cl.
USPC ........................................ 379/257; 348/14.02

(58) Field of Classification Search
USPC ............... 348/14.01, 14.02; 379/207.16, 257; 370/352; 455/414.1
See application file for complete search history.

(56) References Cited

U.S. PATENT DOCUMENTS

2007/0030338 A1* 2/2007 Jiang et al. ................. 348/14.01
2007/0121916 A1* 5/2007 Wang et al. ............. 379/373.01
2007/0211872 A1* 9/2007 Cai et al. .................. 379/142.01

FOREIGN PATENT DOCUMENTS

CN 1750569 A 3/2006
CN 1773967 A 5/2006

(Continued)

OTHER PUBLICATIONS

First Office Action of corresponding Chinese Patent Application No. 200710163578.9, mailed on May 25, 2011, and English translation thereof, 10 pages total.

(Continued)

*Primary Examiner* — Quoc D Tran
(74) *Attorney, Agent, or Firm* — Brinks Hofer Gilson & Lione

(57) ABSTRACT

A method for implementing Ring Back Tone (RBT) interworking, a Media Gateway Control Function (MGCF) device, and an Application Server (AS) are provided. A Multimedia Ring Back Tone (MRBT) service is triggered when a Circuit Switched (CS) user originates a call to an MRBT subscriber in an Internet Protocol Multimedia Subsystem (IMS). The method includes: receiving a message sent by an MRBT AS, where the message carries video RBT information; and notifying a Mobile Switching Center (MSC) to put through a calling terminal if determining that a video RBT needs to be played to the calling terminal according to the message. Therefore, a video RBT can be played when a CS user originates a call to an IMS user in the case of network interworking. An IMS video RBT may be played to the calling party when the CS user originates a call to the IMS user.

12 Claims, 12 Drawing Sheets

(56) References Cited

FOREIGN PATENT DOCUMENTS

| | | |
|---|---|---|
| CN | 1801856 A | 7/2006 |
| CN | 1870691 A | 11/2006 |
| EP | 1677485 A1 | 7/2006 |
| WO | 2006137781 A1 | 12/2006 |
| WO | 2007045522 A1 | 4/2007 |
| WO | 2007046645 A1 | 4/2007 |
| WO | 2007109805 A2 | 9/2007 |

OTHER PUBLICATIONS

First Office Action of corresponding Chinese Patent Application No. 200880001439.9, mailed on Jun. 22, 2011, and English translation thereof, 9 pages total.

3GPP TS 23.228 V5.15.0: 3rd Generation Partnership Project; Technical Specification Group Services and System Aspects; IP Multimedia Subsystem (IMS); Stage 2 (Release 5), Jun. 2006, 131 pages.

3GPP TS 23.228 V6.16.0: 3rd Generation Partnership Project; Technical Specification Group Services and System Aspects; IP Multimedia Subsystem (IMS); Stage 2 (Release 6), Mar. 2007, 181 pages.

3GPP TS 24.228 V5.15.0: 3rd Generation Partnership Project; Technical Specification Group Core Network and Terminals; Signalling flows for the IP multimedia call control based on Session Initiation Protocol (SIP) and Session Description Protocol (SDP); Stage 3 (Release 5), Sep. 2006, 851 pages.

Batni R et al: "Evolution of Miringback Service to Multimedia Miringback Service in the IMS Framework," Bell Labs Technical Journal 10 (4), 2006, pp. 53-70.

European search report issued in corresponding European patent application No. 08839043.0, Sep. 10, 2010, 3 pages.

English Translation of written opinion issued in corresponding PCT application No. PCT/CN2008/072617, Jan. 22, 2009, 3 pages.

* cited by examiner

METHOD FOR IMPLEMENTING RBT INTERWORKING, MEDIA GATEWAY CONTROL FUNCTION DEVICE, AND APPLICATION SERVER

This application is a continuation of International Application No. PCT/CN2008/072617, filed Oct. 8, 2008, which claims priority to Chinese Patent Application No. 200710163578.9, filed with the Chinese Patent Office on Oct. 12, 2007 and entitled "Method for Implementing RBT Interworking, Media Gateway Control Function Device, and Application Server", which is incorporated herein by reference in its entirety.

FIELD OF THE INVENTION

The present invention relates to a mobile communication technology, and in particular, to a method for implementing Ring Back Tone (RBT) interworking, a Media Gateway Control Function (MGCF) device, and a Multimedia Ring Back Tone Application Server (MRBT AS).

BACKGROUND OF THE INVENTION

The RBT service is a multimedia service, where a mobile telephone subscriber and a fixed telephone subscriber (including wired fixed telephone subscriber and wireless fixed telephone subscriber) customize a special ring back tone which is played to the calling party in place of a traditional ring back tone. In the networks of different operators, the RBT service may be identified by different trade names.

The system and method for implementing the Multimedia Ring Back Tone (MRBT) service in the prior art implement the RBT function of the 3G Circuit Switched (CS) domain and the RBT function of the 3G Packet Switched (PS) domain, including the RBT function of the IP Multimedia Subsystem (IMS) domain.

However, in the research process, the inventor finds that the prior art enables only the calling terminal in the PS core network to receive the signal tone from a called party in the traditional CS domain, without enabling the calling terminal in the CS domain to receive an MRBT from a called party in the PS core network. This function unavailable from the prior art involves the following technical problems: When a CS user makes a call (video call) to an IMS user, the home Mobile Switching Center (MSC) server of the calling terminal (namely, the originating MSC server) is unable to query whether the called party has subscribed to the MRBT service in a different domain. Moreover, after an Alerting message is received from the called party, it is uncertain whether the calling party needs to be put through, and it is thus impossible to play any IMS video RBT to the CS user.

SUMMARY OF THE INVENTION

A method for implementing RBT interworking, an MGCF device, and an AS are provided in an embodiment of the present invention to enable play of a video RBT when a CS user makes a call to an IMS user in the case of network interworking.

Therefore, a method for implementing RBT interworking is provided in an embodiment of the present invention, where the MRBT service is triggered when a CS user originates a call to an MRBT subscriber in the IMS. The method includes the following steps:

receiving a message sent by an MRBT AS, where the message carries video RBT information; and notifying a home MSC of a calling terminal to put through the calling terminal if determining that a video RBT needs to be played to the calling terminal according to the message.

An MGCF device is provided in an embodiment of the present invention. The device includes:

a receiving device, adapted to receive a message sent by an MRBT AS, where the message carries video RBT information;

a judging unit, adapted to: judge, according to the message received by the receiving unit, whether to play a video RBT to a calling terminal; and a notifying unit, adapted to notify a home MSC of the calling terminal to put through the calling terminal after receiving a positive judgment result from the judging unit.

An MRBT AS is provided in an embodiment of the present invention. The mode applicable to the RBT is a gateway mode. The MRBT AS includes:

a receiving unit, adapted to receive a call request from an MGCF entity when a CS user originates a call to an MRBT subscriber in the IMS;

a judging unit, adapted to: judge whether the call request is sent by the MGCF entity, judge whether the call request is a video call request from the 3G CS domain, and send a judgment result if the received message carries video RBT information; and an adding or putting-through unit, adapted to: add an RBT service identifier to the sent message that carries early RBT media after receiving a positive judgment result from the judging unit, or send a link setup message to the MGCF entity, where the link setup message instructs the MGCF entity to notify the MSC to put through the calling terminal, and preferably, the message is sent after receiving an Alerting message from the called party.

The foregoing technical solution shows that in the embodiments of the present invention, the MRBT service is triggered when a CS user originates a call to an MRBT subscriber in the IMS. The MRBT server sends a message that carries video RBT information to the MGCF server, and then judges whether a video RBT needs to be played to the calling terminal according to the message, and notifies the home MSC of the calling terminal to put through the calling terminal if a video RBT needs to be played to the calling terminal. It is thus evident that the embodiments of the present invention implement RBT interworking between the CS domain and the IMS domain; when a CS user originates a call (video call) to an IMS user, an IMS video RBT may be played to the calling party, thus enhancing the user experience.

DETAILED DESCRIPTION OF THE INVENTION

Figure 1:
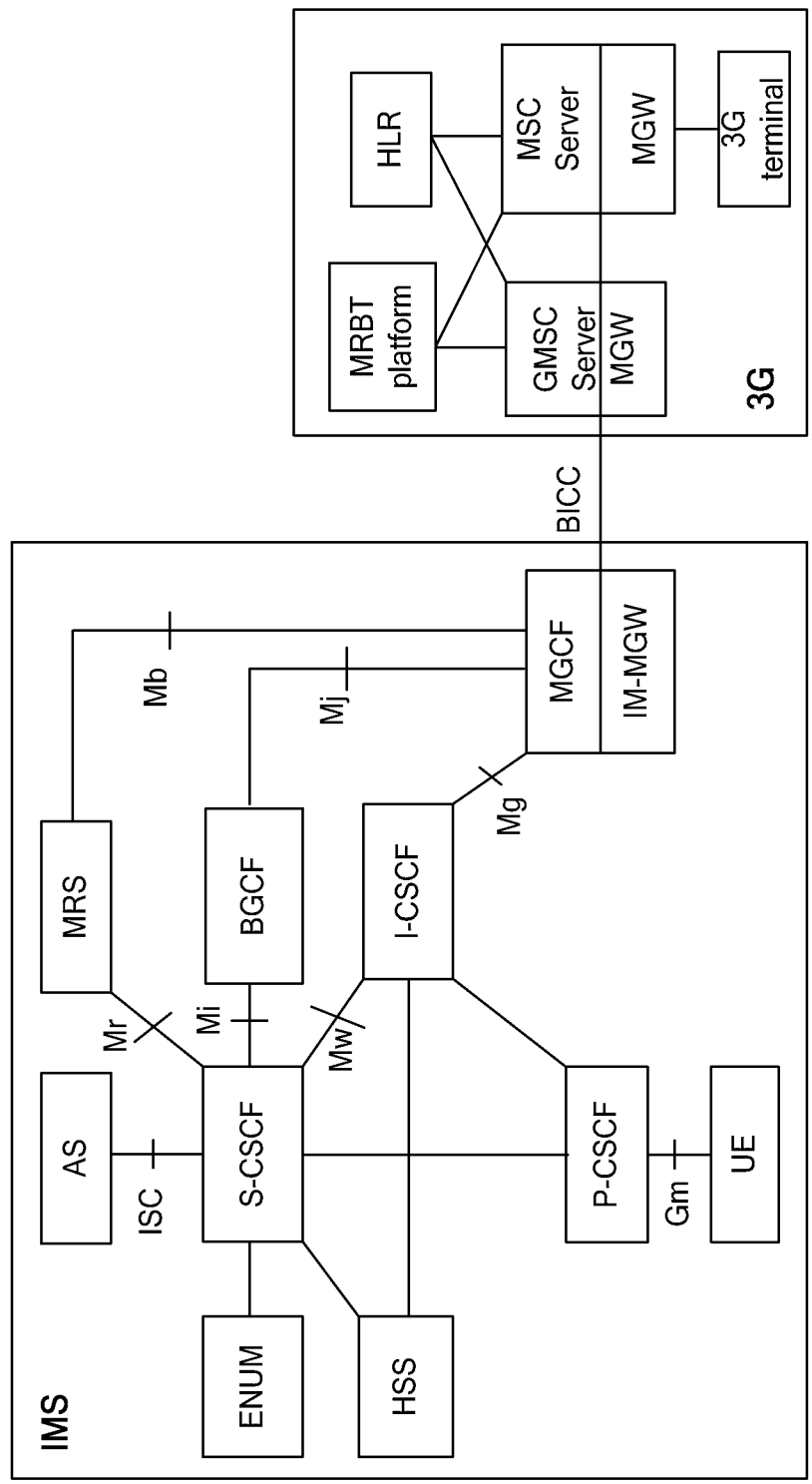
FIG. 1 shows reference points and network elements involved in RBT interworking in the IMS domain in an embodiment of the present invention.

First of all, the reference points and network elements involved in the RBT interworking in the IMS domain are described below. As shown in FIG. 1, the involved reference points (namely, interfaces) are:

ISC: This interface is adapted to exchange messages between the IMS RBT server and the Serving-Call Session Control Function (S-CSCF);

Mr: This interface is adapted to exchange messages between the Multimedia Resource Function Controller (MRFC) and the S-CSCF at the time of playing an IMS RBT;

Mi: This interface is adapted to exchange messages between the Breakout Gateway Control Function (BGCF) and the S-CSCF in the session initiated by the IMS to the CS domain;

Mw: This interface exists between different CSCFs, and is adapted to exchange messages between the CSCFs when an RBT is played from the CS domain to an IMS user;

Mg: Through this interface, the Media Gateway Control Function (MGCF) converts the Integrated Service Data Network User Part (ISUP) signaling into a Session Initiation Protocol (SIP) signaling and forwards the SIP signaling to the Interrogating-Call Session Control Function (I-CSCF);

Mj: This interface is adapted to exchange messages between the BGCF and the MGCF in the same IMS network; and Mb: This interface is adapted to exchange media streams between the Multimedia Resource Function Processor (MRFP) and the Internet Protocol Multimedia GateWay (IM-MGW) of the user-plane entity.

The involved network elements and their functions are described below:

MGCF/IM-MGW:

The MGCF is a gateway that enables the communication between an IMS user and a CS user. All call control signaling messages from the CS user are transmitted to the MGCF. The MGCF is responsible for protocol conversion between the ISUP/Bearer Independent Call Control (BICC) and the SIP protocol.

All sessions initiated by the IMS user and directed to the CS user pass through the MGCF. The MGCF controls the media channel in the correlated IM-MGW.

The IM-MGW provides a user plane link between the CS network and the IMS network. It terminates the bearer channel and media streams from the CS network, and originates the bearer channel and media streams to the IMS network.

To support video interworking, it is necessary to implement the Video Interworking Gateway (VIG) function that supports signaling conversion and media negotiation. Specifically, the VIG function may be built in a network device such as an MGCF, or a special video interworking network element is applied to handle video interworking.

In the embodiments of the present invention, it is supposed that the VIG function is built in the MGCF/IM-MGW.

The MGCF/IM-MGW is combined with the BGCF into an interworking network element to implement the MRBT service on the CS videophone.

It is worthy of attention that in the following embodiments, the expression "MGCF" involves only the function of the MGCF, but the expression "MGCF/IM-MGW" involves the functions of the MGCF and the IM-MGW.

MRS: This network element is a Multimedia Resource Server (MRS) in the IMS domain. It works as an RBT server and provides voice and video RBTs for the IMS users.

The present invention is detailed below with reference to accompanying drawings and exemplary embodiments.

Figure 2:
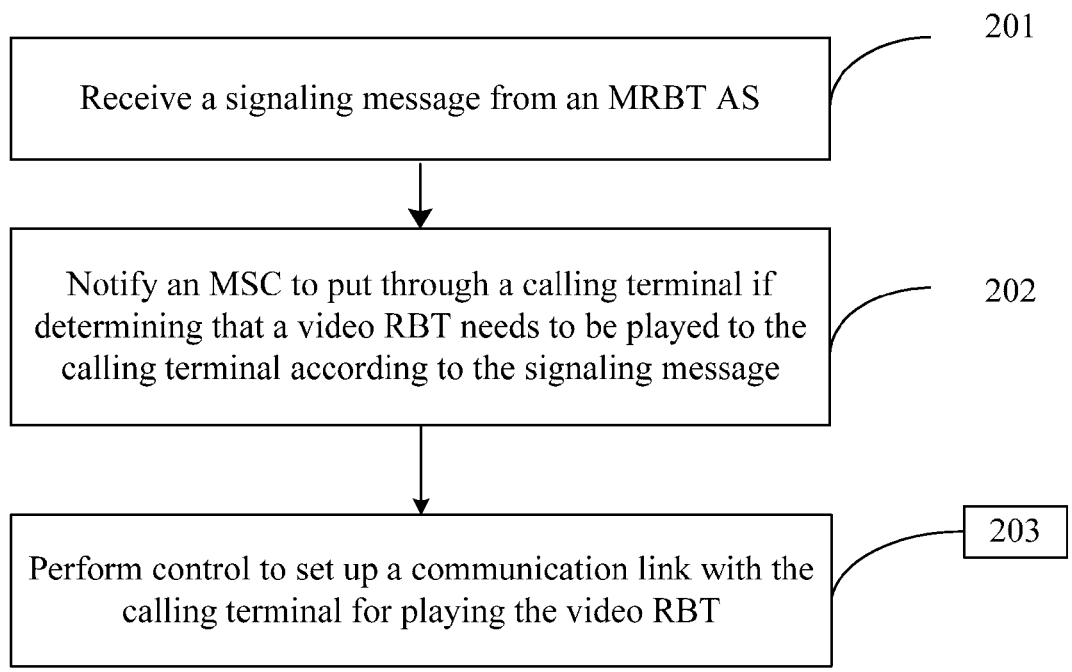
FIG. 2 is a flowchart of a method for implementing RBT interworking in an embodiment of the present invention.

FIG. 2 is a flowchart of a method for implementing RBT interworking in an embodiment of the present invention. The method includes the following steps:

Step 201: A call signaling message from an MRBT AS is received, where the call signaling message carries video RBT information.

Step 202: Whether to play a video RBT to the calling terminal according to the call signaling message is judged. If a video RBT needs to be played to the calling terminal, the home MSC of the calling terminal is notified to put through the calling terminal.

Step 203: Setting up a communication link with the calling terminal for playing a video RBT is controlled.

In this embodiment, step 203 is optional. The control entity may be a multimedia control function entity such as an MGCF, or a VIG. In this embodiment, it is supposed that the control entity is an MGCF.

Figure 3:
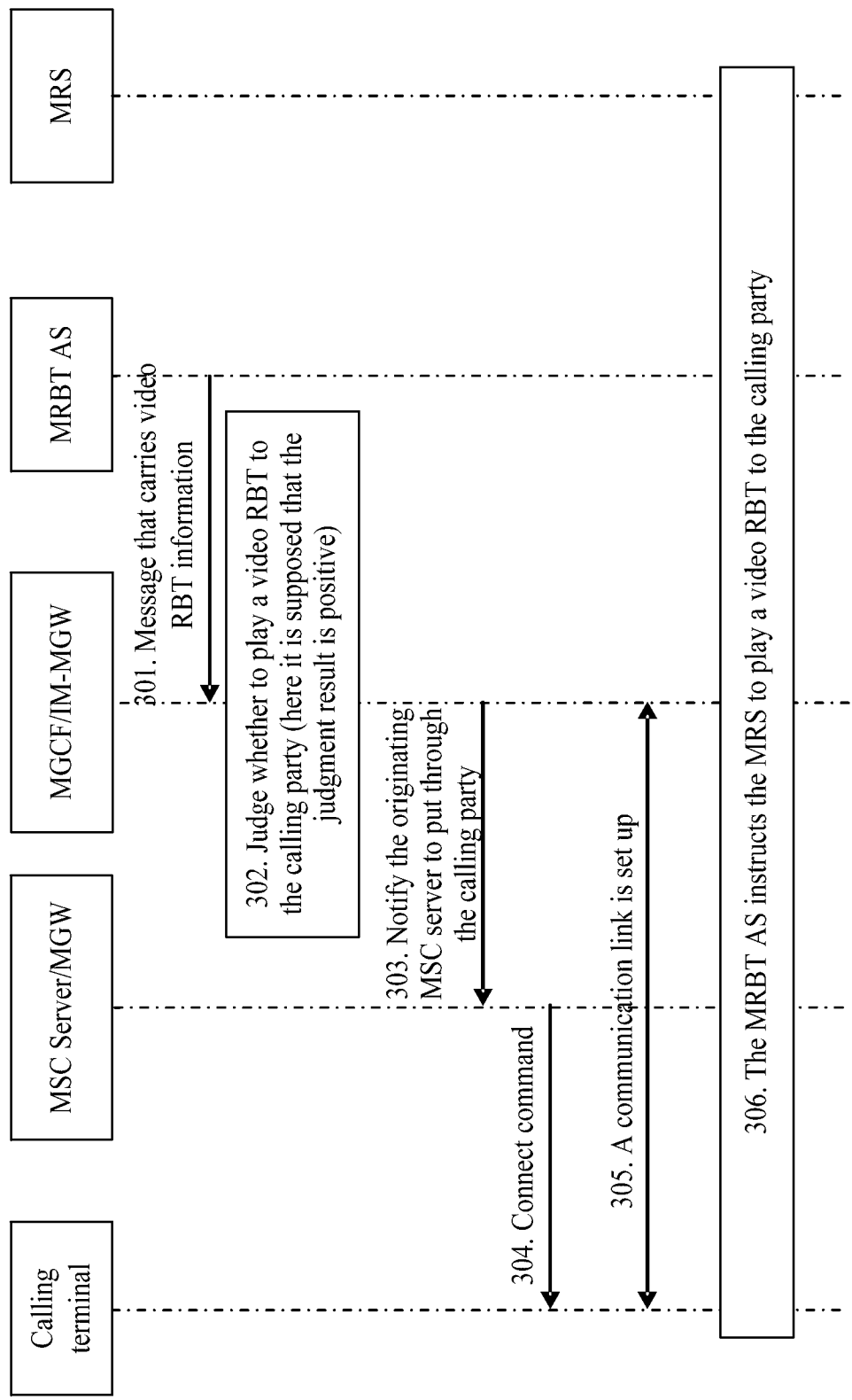
FIG. 3 is a signaling flowchart of a method for implementing RBT interworking in an embodiment of the present invention.

In this embodiment, when a CS user originates a call to an IMS user, the home MSC server of the calling terminal can obtain information about whether a video RBT needs to be played to the calling party, and can determine whether to put through the calling party after receiving an Alerting message from the called party, thus playing an IMS video RBT to the CS user. The technical solution provided in this embodiment is: The MGCF resolves the message (for example, a 183 (Session Progress) message) that carries early media) sent by the RBT AS, and judges whether to play a video RBT to the calling party according to the information carried in the message. If a video RBT needs to be played to the calling party, a notification is sent to the originating MSC server. The notification may be sent through a Call ProGress (CPG) message or an Alerting message, or through other messages, which are not limited herein). The notification instructs the originating MSC server to put through the calling party and set up a communication link with the calling terminal for playing a video RBT. As shown in FIG. 3, the implementation process includes the following steps:

Step 301: The MRBT AS sends a message that carries video RBT information to the MGCF. That is, if a video RBT needs to be played to the calling party, video RBT information is carried in the sent message. The message may be a 183 message, an Update message, and so on. The video RBT information indicates whether a video RBT needs to be played to the calling party. Examples of video RBT information are: video Session Description Protocol (SDP) information in the early RBT media, early RBT media service identifier, and signaling-related header field (for example, the early media header field "P-Early-Media", or RBT service identifier).

Step 302: After receiving the message, the MGCF judges whether to play a video RBT to the calling party. In this process, it is supposed that a video RBT needs to be played to the calling party, and the process proceeds to step 303.

Step 303: After receiving the Alerting message from the called party, the MGCF sends a notification to the originating MSC server to instruct the originating MSC server to put through the calling terminal. No charging is performed.

Step 304: The originating MSC server sends a Connect command to the calling terminal to put through the calling party.

Step 305: A communication link is set up between the calling terminal and the MGCF/IM-MGW. Specifically, the MGCF controls the IM-MGW to set up a communication link with the calling terminal.

Step 306: A media channel is set up, and the MRBT AS instructs the MRS to play an RBT to the calling party.

To help those skilled in the art to better understand the present invention, the embodiments of the present invention are described with respect to two RBT modes (namely, early media server mode, and early media gateway mode) respectively:

Embodiment 1

RBT Interworking in Early Media Server Mode

Figure 4:
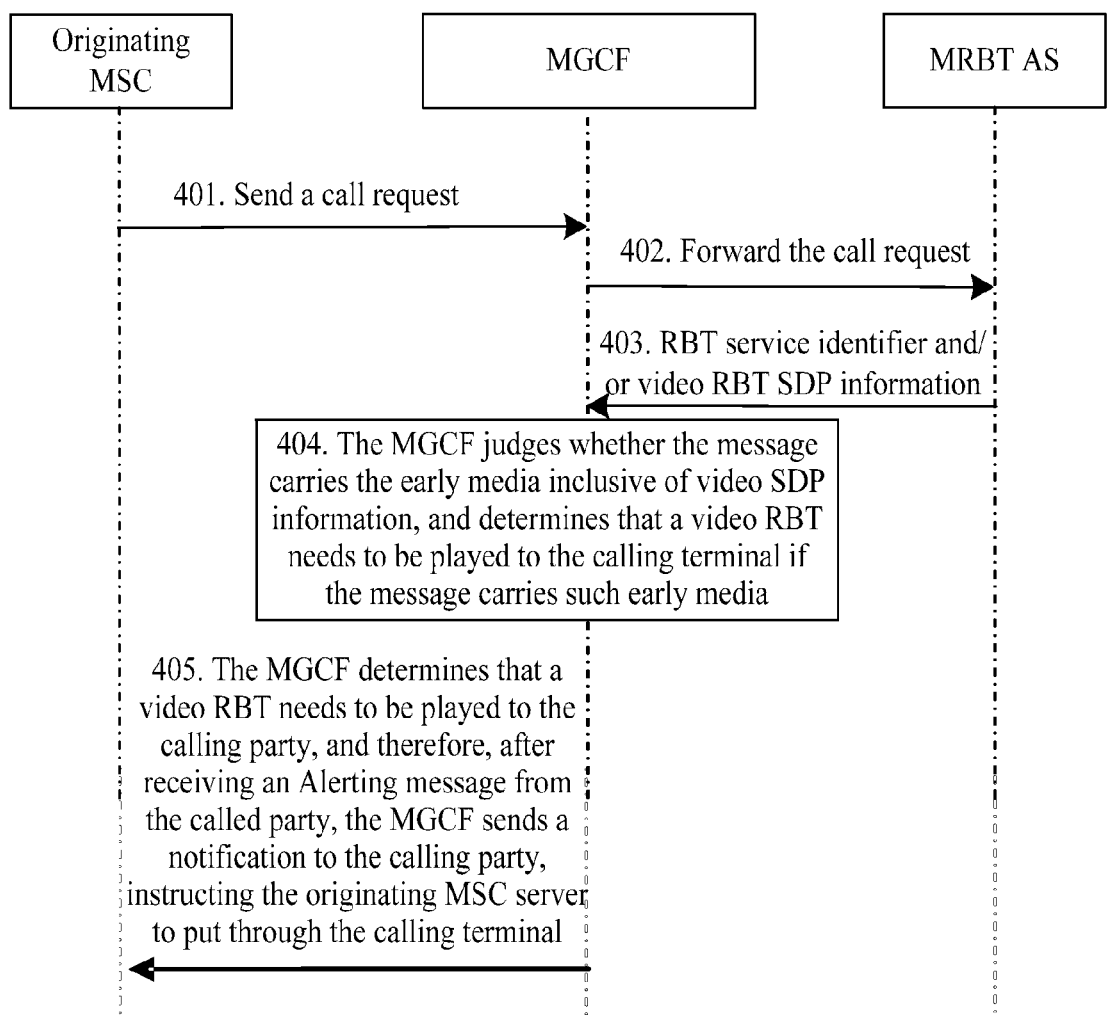
FIG. 4 is a flowchart of a method for implementing RBT interworking in server mode in an embodiment of the present invention.

FIG. 4 is a flowchart of a method for implementing RBT interworking in server mode in an embodiment of the present invention. The method includes the following steps:

Step 401: The originating MSC server (namely, the originating MSC in FIG. 4) sends a call request to the MGCF.

Step 402: The MGCF forwards the received call request to the MRBT AS.

Step 403: The MRBT AS handles the calls sent by the MGCF and the received IMS calls uniformly. That is, it is not necessary to identify whether the Invite message is sent by the MGCF or by the IMS user terminal. If the current call is a video call and the called party is an RBT subscriber, the message returned by the MRBT AS carries the early RBT media inclusive of video SDP information.

The method may further include the following:

Whether the early media carried in the message are early RBT media is identified in the message sent by the MRBT AS. To carry the RBT service identifier, it is practicable to add a new SIP header field, extend the value of a header field, or extend SDP information to indicate that the message carries early RBT media. Alternatively, an RBT service identifier is added to the early media SDP information (or a corresponding media attribute flag is set). For example, the session-level attribute line "line a" in the early media SDP information may be extended to describe the media type as "early RBT media", as exemplified below:

a=Service-Type: MRBT where "Service-Type" indicates a service type.

Step 404: After receiving the message returned by the MRBT AS, the MGCF judges whether the message carries the early media inclusive of video SDP information, and determines that a video RBT needs to be played to the calling terminal if the message carries such early media.

The method may further include: The MGCF determines that the early media carried in the message are early RBT media according to the RBT service identifier carried in the message. That is, the MGCF determines that a video RBT needs to be played to the calling party according to the RBT service identifier and the video SDP information.

Step 405: The MGCF determines that a video RBT needs to be played to the calling party. Therefore, after receiving an Alerting message from the called party, the MGCF sends a notification (for example, through the CPG message) to the calling party, instructing the originating MSC server to put through the calling terminal.

Embodiment 2

RBT Interworking in Early Media Gateway Mode

Figure 5:
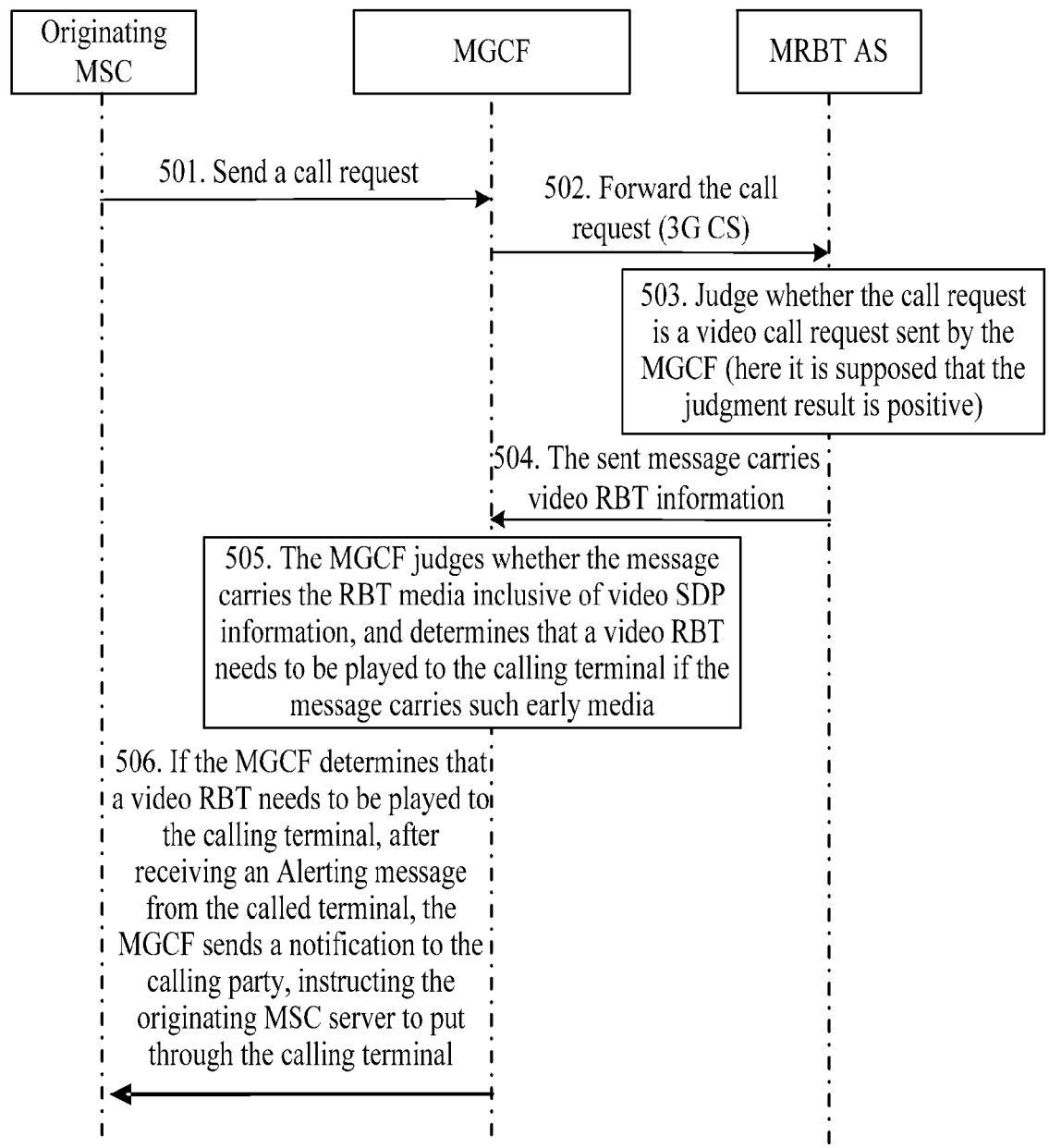
FIG. 5 is a flowchart of a method for implementing RBT interworking in gateway mode in an embodiment of the present invention.

FIG. 5 is a flowchart of a method for implementing RBT interworking in gateway mode in an embodiment of the present invention. The method includes the following steps:

Step 501: The originating MSC server (namely, the originating MSC in FIG. 5) sends a call request to the MGCF. The call request is a video call request of the 3G CS domain.

Step 502: The MGCF forwards the received call request to the MRBT AS.

The MGCF may add a 3G CS video call identifier to the forwarded call request to indicate that the call request is a video call request from the 3G CS domain.

Step 503: The MRBT AS judges whether the received video call request is sent by the MGCF. If the received video call request is sent by the MGCF, the MRBT AS adds an RBT service identifier to a 183 message carrying RBT media to indicate that the message carries the RBT media, and sends the message to the MGCF.

Preferably, the method may include step 504: The message sent by the MRBT AS to the MGCF carries video RBT information. Specifically, a new SIP header field is added to the message, or a header field value is extended, or the SDP information is extended to carry the RBT service identifier. The present invention is not limited to the mode of carrying the video RBT information. Alternatively, a service identifier may be set in the "Contact" header field. For example, "MRBT" is added to the "schemes" value of the Contact header field, or an RBT service identifier is added to the RBT media SDP information, or line a may be extended to describe the media type as "RBT media", as exemplified below:

a=Service-Type: MRBT

Optionally, the MRBT AS may send another message (for example, a SIP message such as a 183 message or an Update message) which instructs the MGCF to notify the MSC server to put through the calling party.

In a preferred embodiment, step 503 is omissible. That is, in step 502, the MGCF does not need to add any 3G CS video call identifier to the forwarded call request. The MRBT AS handles the calls sent by the MGCF and the received IMS calls uniformly, without the necessity of identifying whether the Invite message is sent by the MGCF or by the IMS user terminal. If the current call is a video call and the called party is an RBT subscriber, the message returned by the MRBT AS carries the RBT media inclusive of video SDP information, and carries the P-Early-Media header field that indicates the early media direction attribute.

Step 505: After receiving the message sent by the MRBT AS, the MGCF judges whether the message carries the RBT media inclusive of video SDP information, or judges whether the message is an instruction message, and, if so, determines that a video RBT needs to be played to the calling terminal.

Step 506: If the MGCF determines that a video RBT needs to be played to the calling party, the MGCF sends a notification (for example, through the CPG message) to the calling party after receiving an Alerting message from the called party. The notification instructs the originating MSC server to put through the calling terminal.

Figure 6A:
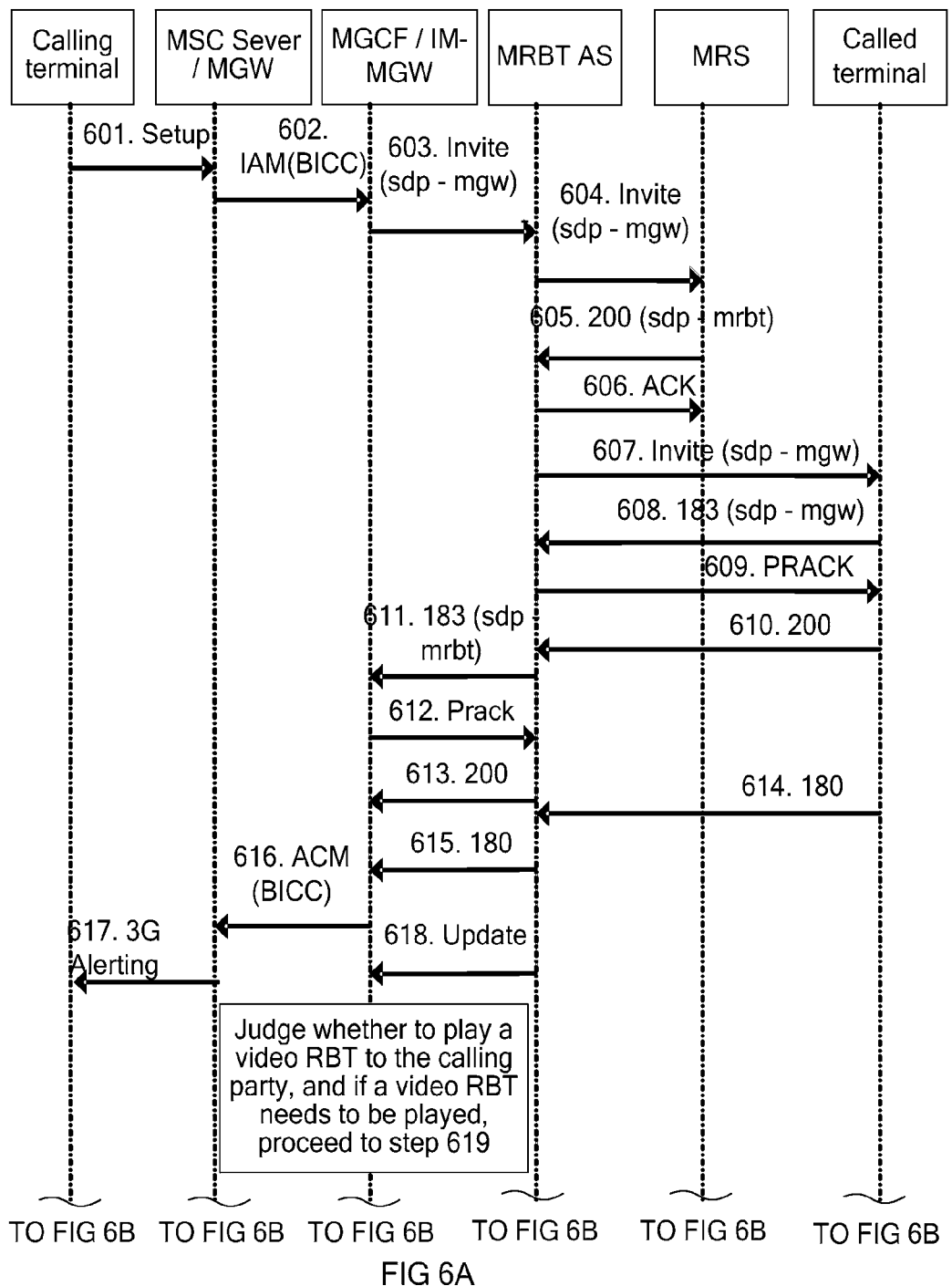
FIG. 6 is a signaling flowchart of interworking in gateway mode in an embodiment of the present invention.
Figure 6B:
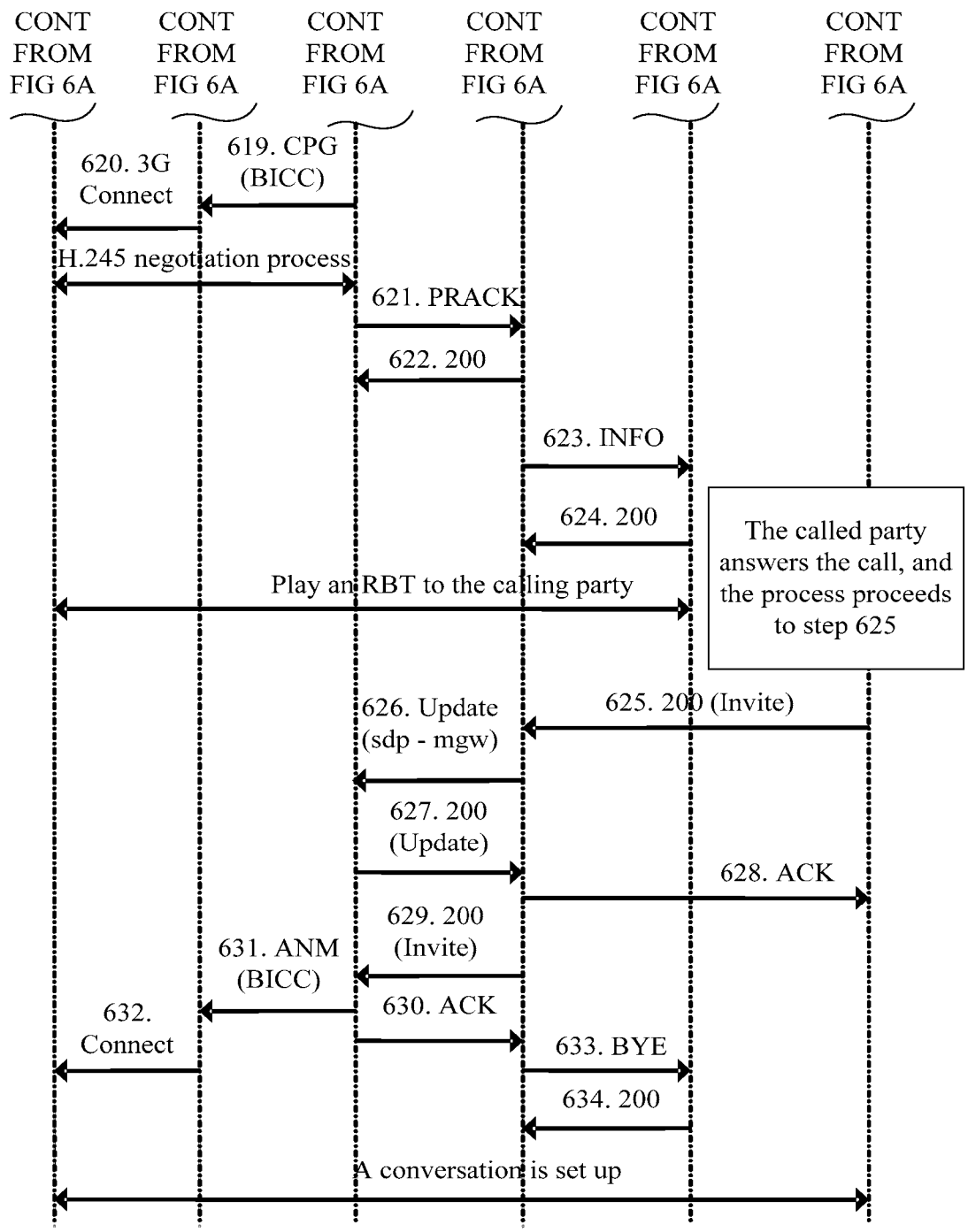

FIG. 6 is a signaling flowchart of interworking in gateway mode in an embodiment of the present invention. In the signaling flow, a CS user originates a call to an IMS user, and an IMS video RBT is played.

Note:

(a) To highlight the RBT call process, it is simplified in FIG. 6 that the message interaction between the MSC server and the terminal user.

(b) To highlight the RBT signaling flow, it is omitted in FIG. 6 that omits the media control process between the MGCF and the IM-MGW. A standard H.248 gateway control protocol is applied between the MGCF and the IM-MGW.

(c) It is omitted in the FIG. 6 that the signaling interaction between the originating MSC server and the GMSC, the signaling interaction between the GMSC and the MGCF, and the signaling forwarding and service triggering processes performed through the core network (S-CSCF and P-CSCF). That is, the method showed in the FIG. 6 includes: a CS user originates a call to an IMS user; after being converted through the MGCF, the call signaling is routed to the S-CSCF, and triggered to the MRBT AS in the IMS domain.

The detailed signaling flow includes the following steps:

Steps 601-603: A calling terminal sends a call setup message, which is routed through the MSC server and the GMSC server (omitted in FIG. 6) to the MGCF. After receiving the IAM (BICC), the MGCF converts the IAM (BICC) into an Invite (SDP-MGW) message, which is triggered to the MRBT AS in the IMS domain. The Invite message carries a CS video call identifier.

Steps 604-610: According to the identifier carried in the message, the MRBT AS resolves the message to know that the call request is a video call request from the MGCF, and originates a session request to the MRS and the called terminal to perform media negotiation. The negotiation process is illustrated in FIG. 6.

Steps 611-613: The MRBT AS sends a 183 reliable response to the MGCF. The 83 reliable response carries SDP (sdp-mrbt) information negotiated with the MRS. The MGCF controls the IM-MGW to set up a media connection with the MRS.

Steps 614-617: The MRBT AS sends a 180 reliable response to the MGCF. The MGCF converts 180 reliable the response into an Alerting message "Address Complete Message (ACM) (BICC)", and sends the Alerting message to the calling terminal through the originating MSC.

Steps 618-620: The MRBT AS sends a special Update message to the MGCF. The Update message carries information that indicates "playing a video RBT to the calling party". According to the received Update message, the MGCF determines that a video RBT needs to be played to the calling party, and sends a CPG message which instructs the originating MSC server to put through the calling terminal. At this time, no charging is performed. The calling terminal performs H.245 capability negotiation with the MGCF/IM-MGW, and sets up a media connection. For example, the MGCF controls the IM-MGW to set up a media connection with the calling terminal.

H.245 is a multimedia communication control signaling protocol for solving the problems related to the call media type. Before the call is set up, the protocol is required for setting up media streams; after the call is set up, this protocol manages the call.

Steps 621-624: After receiving the provisional reliable response (PRACK) from the MGCF, the MRBT AS instructs the MRS to play an RBT, and the MGCF controls the IM-MGW to convert media streams for both sides.

The MRS plays an RBT to the calling terminal

Step 625: The called terminal receives the RBT, and returns a 200 message to the MRBT AS.

Steps 626-627: By using the SDP information negotiated with the called terminal in steps 606-609, the MRBT AS performs Update redirection with the MGCF. The MGCF controls the IM-MGW to set up a media connection with the called terminal.

Step 628: The MRBT AS returns an ACK message to the called terminal.

Steps 629-632: The MRBT AS sends a 200 answer to the MGCF. The MGCF converts the 200 answer into an answer message "ANM (BICC)", and sends a Connect message through the originating MSC to the calling terminal.

Steps 633-634: After receiving the ACK message from the MGCF, the MRBT AS instructs the MRS to disconnect the connection.

The conversation between the calling terminal and the called terminal is set up.

Figure 7A:
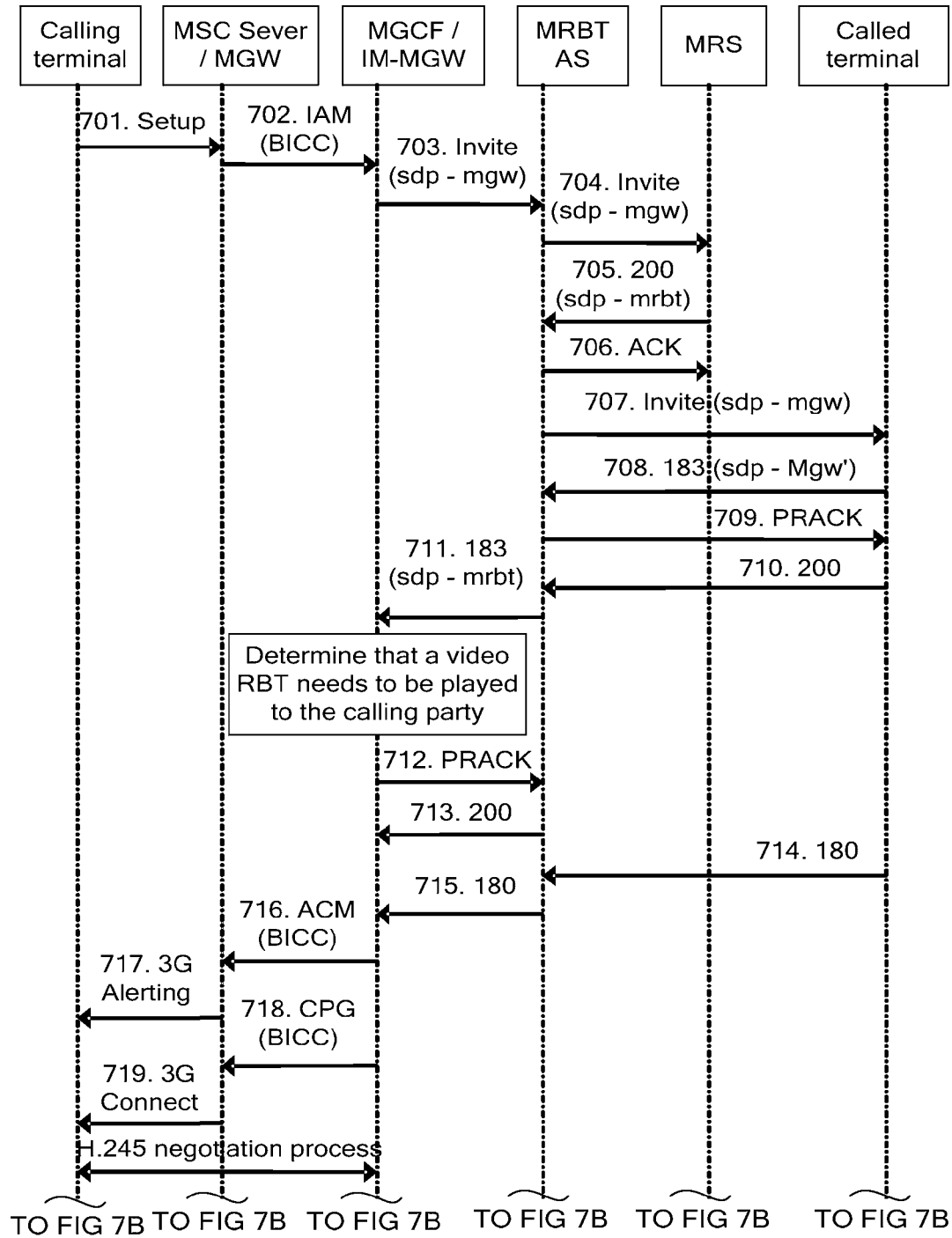
FIG. 7 is another signaling flowchart of interworking in gateway mode in an embodiment of the present invention.
Figure 7B:
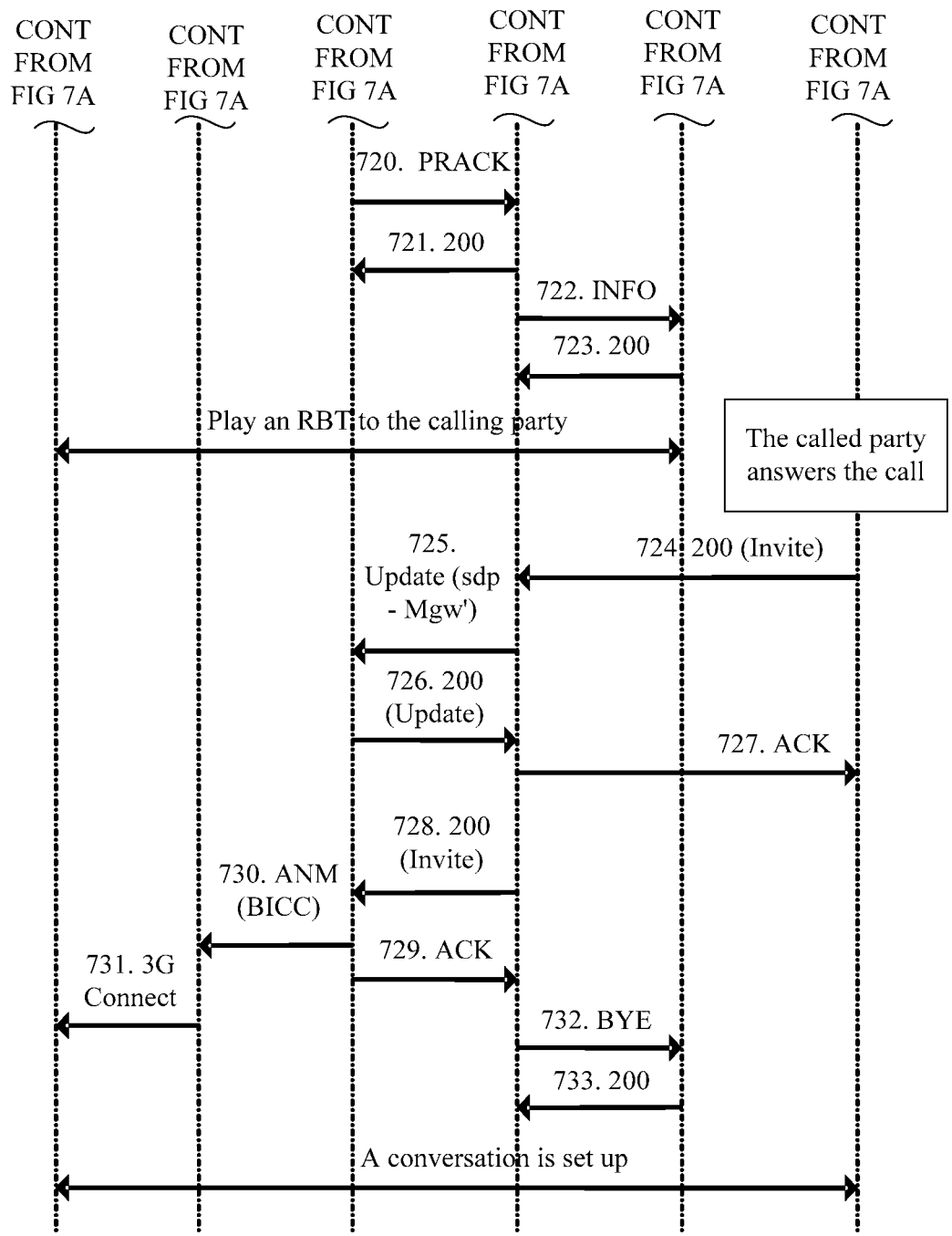

FIG. 7 is another signaling flowchart of interworking in gateway mode in an embodiment of the present invention. In this signaling flow, a CS user originates a call to an IMS user, and an IMS video RBT is played.

Note:

(a) To highlight the RBT call process, it is simplified in FIG. 7 that the message interaction between the MSC server and the terminal user.

(b) To highlight the RBT signaling flow, it is omitted in FIG. 7 that the media control process between the MGCF and the IM-MGW. A standard H.248 gateway control protocol is applied between the MGCF and the IM-MGW.

(c) It is omitted in FIG. 7 that the signaling interaction between the originating MSC server and the GMSC, the signaling interaction between the GMSC and the MGCF, and the signaling forwarding and service triggering processes performed through the core network (S-CSCF and P-CSCF). A CS user originates a call to an IMS user. After being converted through the MGCF, the call signaling is routed to the S-CSCF, and triggered to the MRBT AS in the IMS domain.

The detailed signaling flow includes the following steps:

Steps 701-703: The calling terminal sends a call setup message, which is routed through the MSC server and the GMSC server (omitted in FIG. 7) to the MGCF. After receiving an IAM (BICC), the MGCF converts the IAM into an Invite (SIP) message, which is triggered to the MRBT AS in the IMS domain.

Steps 704-710: The MRBT AS sends a session request to the MRS and the called terminal to perform media negotiation. The detailed negotiation process is illustrated in FIG. 7.

Steps 711-713: The MRBT AS sends a 183 reliable response to the MGCF. The response carries SDP information negotiated with the MRS and carries an RBT service identifier, indicating that the SDP information is early RBT media SDP information. The MGCF controls the IM-MGW to set up a media connection with the MRS. Meanwhile, the MGCF resolves the received 183 reliable response, and judges whether to play a video RBT to the calling party. In the process provided in this embodiment, it is supposed that the SDP information carried in the 183 message is early RBT media SDP information, which carries video media information.

Steps 714-717: The MRBT AS sends a 180 reliable response to the MGCF. The MGCF converts the response into an Alerting message "ACM (BICC)", and sends the "Alerting" message through the originating MSC to the calling terminal.

Steps 718-719: According to the judgment result obtained previously, the MGCF sends a CPG message, which instructs the originating MSC server to put through the calling terminal. At this time, no charging is performed. The calling terminal performs H.245 capability negotiation with the MGCF/

IM-MGW, and sets up a media connection. For example, the MGCF controls the IM-MGW to set up a media connection with the calling terminal.

In a preferred embodiment, steps 718-719 are omissible. The ACM (BICC) Alerting message in step 716 instructs the MSC server to put through the calling terminal. The calling terminal performs H.245 capability negotiation with the MGCF/IM-MGW to set up a media connection. For example, the MGCF controls the IM-MGW to set up a media connection with the calling terminal.

Steps 720-723: After receiving the provisional reliable response (PRACK) from the MGCF, the MRBT AS instructs the MRS to play an RBT, and the MGCF controls the IM-MGW to convert media streams for both sides.

The MRS plays an RBT to the calling terminal

Step 724: The called terminal receives the RBT, and returns a 200 message to the MRBT AS.

Steps 725-726: By using the SDP information negotiated with the called terminal in steps 706-709, the MRBT AS performs Update redirection with the MGCF. The MGCF controls the IM-MGW to set up a media connection with the called terminal.

Step 727: The MRBT AS returns an ACK message to the called terminal

Steps 728-731: The MRBT AS sends a 200 answer to the MGCF. The MGCF converts the answer into an answer message "ANM (BICC)", and sends a Connect message through the originating MSC to the calling terminal.

Steps 732-733: After receiving the ACK message from the MGCF, the MRBT AS instructs the MRS to disconnect the connection.

Figure 8A:
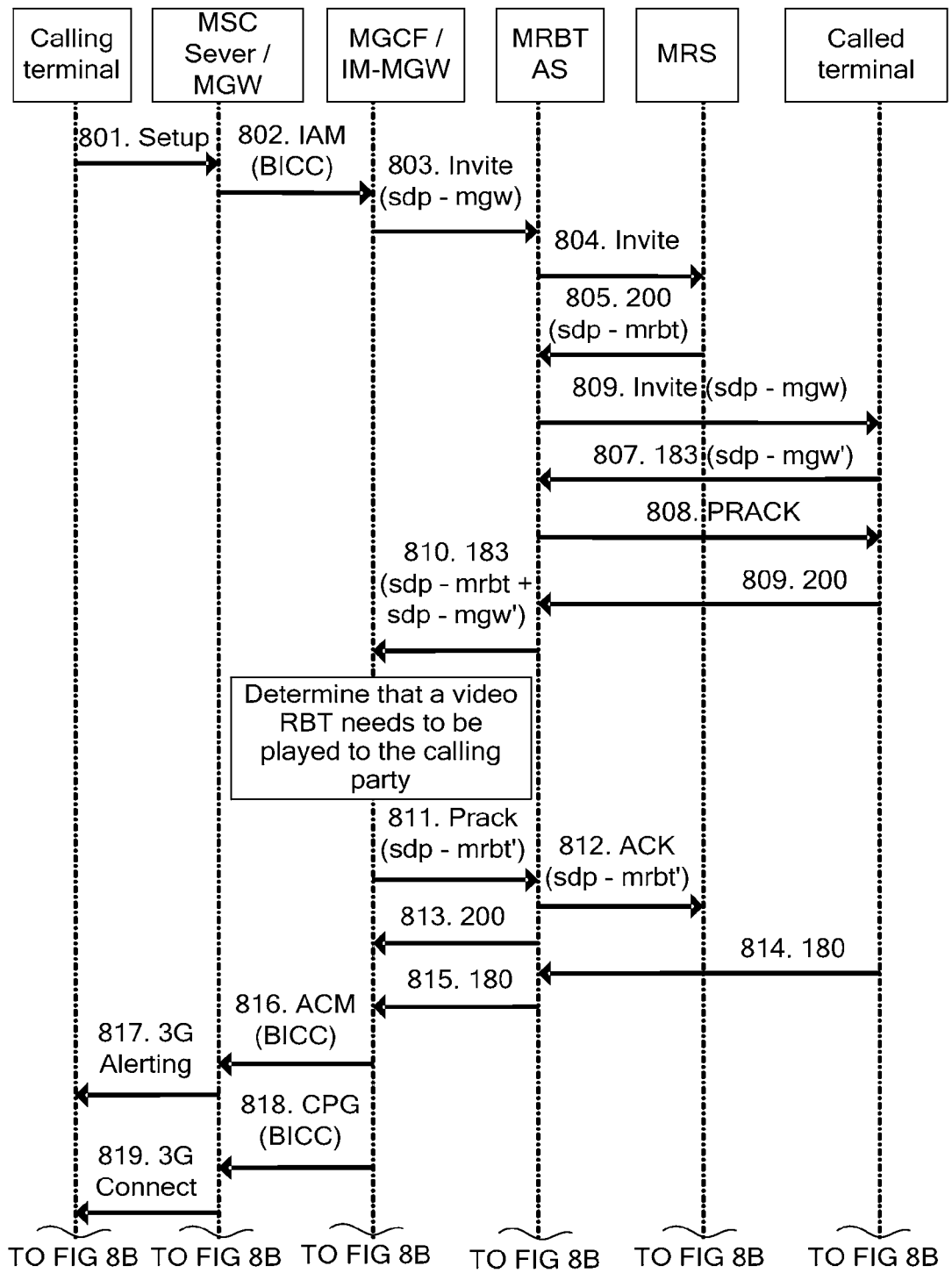
FIG. 8 is a signaling flowchart of interworking in server mode in an embodiment of the present invention.
Figure 8B:
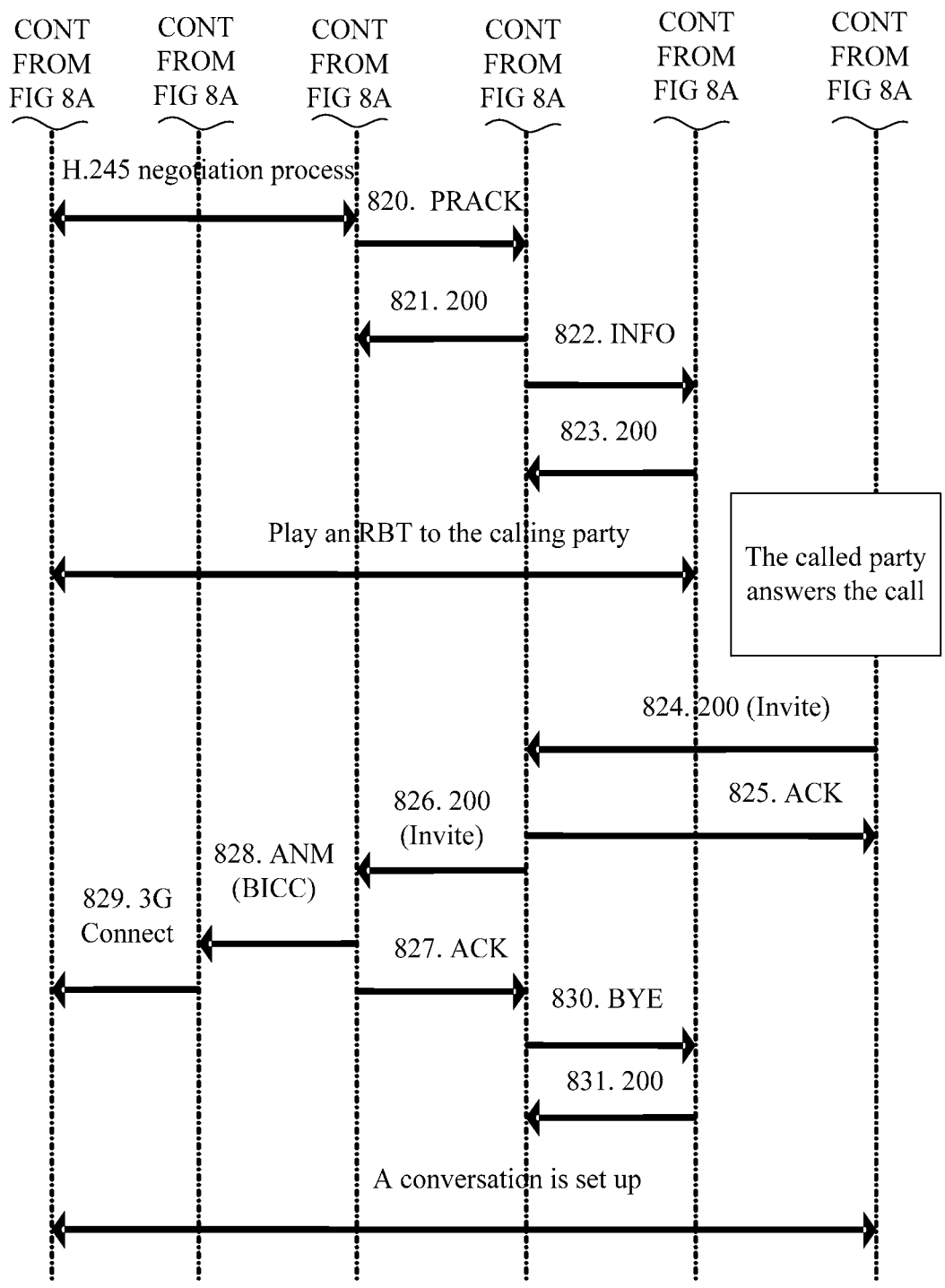

FIG. 8 is a signaling flowchart of interworking in server mode in an embodiment of the present invention. In the signaling flow, a CS user originates a call to an IMS user, and an IMS video RBT is played.

Note:

(a) To highlight the RBT call process, it is simplified in FIG. 8 that the message interaction between the MSC server and the terminal user.

(b) To highlight the RBT signaling flow, it is omitted in FIG. 8 that the media control process between the MGCF and the IM-MGW. A standard H.248 gateway control protocol is applied between the MGCF and the IM-MGW.

(c) It is omitted in FIG. 8 that the signaling interaction between the originating MSC server and the GMSC, the signaling interaction between the GMSC and the MGCF, and the signaling forwarding and service triggering processes performed through the core network (S-CSCF and P-CSCF). A CS user originates a call to an IMS user. After being converted through the MGCF, the call signaling is routed to the S-CSCF, and triggered to the MRBT AS in the IMS domain.

The detailed signaling flow includes the following steps:

Steps 801-803: The calling terminal sends a call setup message, which is routed through the MSC server and the GMSC server (omitted in FIG. 8) to the MGCF. After receiving an IAM (BICC), the MGCF converts the IAM into an Invite (SIP) message, which is triggered to the MRBT AS in the IMS domain.

Steps 804-805: The MRBT AS sends a call request to the MRS. The MRS returns a 200 response to the MRBT AS. The message carries an early media request (sdp-mrbt) for playing an RBT.

Steps 806-809: The MRBT AS sends a call request to the called party to perform normal media negotiation.

Step 810: The MRBT AS sends a 183 reliable response to the MGCF. The response carries the negotiated normal media SDP information (SDP-MGW'), and carries the SDP (sdp-mrbt) information of the MRS for the purpose of early RBT media negotiation. The 183 reliable response may carry an RBT service identifier, indicating that the carried sdp-mrbt is early RBT media. After receiving the message, the MGCF determines that a video RBT needs to be played to the calling party according to the sdp-mrbt.

Steps 811-813: The MGCF/IM-MGW performs early RBT media negotiation according to its own capabilities, and sends the negotiated early RBT media (sdp-mrbt') to the MRBT AS through a PRACK message. The MRBT AS sends the sdp-mrbt' to the MRS through an ACK message, and returns a 200 message to the MGCF. The MGCF controls the IM-MGW to set up a media connection with the MRS.

Steps 814-817: The MRBT AS sends a 180 reliable response to the MGCF. The MGCF converts the response into an Alerting message "ACM (BICC)", and then the originating MSC sends the "Alerting" message to the calling terminal.

Steps 818-819: According to the judgment result obtained previously, the MGCF sends a CPG message, which instructs the originating MSC server to put through the calling terminal. At this time, no charging is performed. The calling terminal performs H.245 capability negotiation with the MGCF/IM-MGW, and sets up a media connection. For example, the MGCF controls the IM-MGW to set up a media connection with the calling terminal.

In a preferred embodiment, steps 818-819 are omissible. The ACM (BICC) Alerting message in step 816 instructs the MSC server to put through the calling terminal. The calling terminal performs H.245 capability negotiation with the MGCF/IM-MGW to set up a media connection. For example, the MGCF controls the IM-MGW to set up a media connection with the calling terminal.

Steps 820-823: After receiving the provisional reliable response (PRACK) from the MGCF, the MRBT AS instructs the MRS to play an RBT, and the MGCF controls the IM-MGW to convert media streams at both sides.

Steps 824-829: The called terminal answers the call, and returns a 200 message to the MRBT AS. The MRBT AS returns an ACK message to the called terminal, and sends a 200 answer to the MGCF. The MGCF converts the 200 answer into an answer message "ANM (BICC)", and sends a Connect message through the originating MSC to the calling terminal.

Steps 830-831: After receiving the ACK message from the MGCF, the MRBT AS instructs the MRS to disconnect the connection.

The conversation between the calling terminal and the called terminal is set up.

Figure 9:
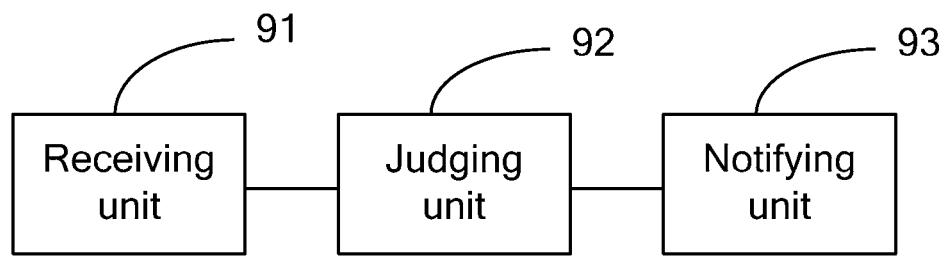
FIG. 9 shows a structure of a MGCF device provided in an embodiment of the present invention.

Accordingly, an MGCF device is provided in an embodiment of the present invention. As shown in FIG. 9, the device includes: a receiving unit 91, a judging unit 92, and a notifying unit 93. The receiving unit 91 is adapted to receive a call signaling message sent by the MRBT AS. The call signaling message carries video RBT information, including: video SDP information in the early RBT media; or video SDP information in the early RBT media and an RBT service identifier. The judging unit 92 is adapted to: judge whether to play a video RBT to the calling terminal according to the call signaling message received by the receiving unit, and send a judgment result. The notifying unit 93 is adapted to notify the home MSC of the calling terminal to put through the calling terminal after receiving a positive judgment result from the judging unit.

Figure 10:
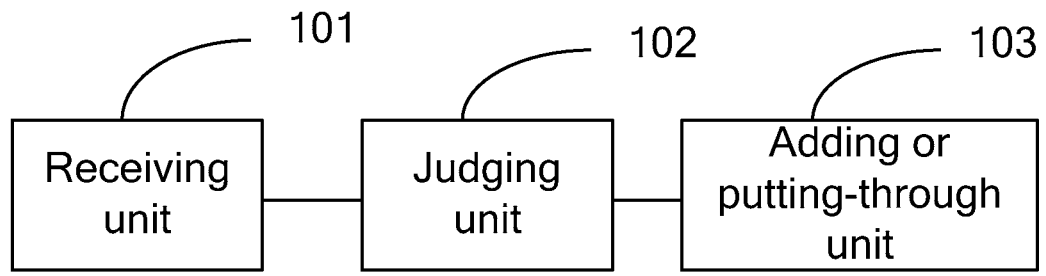
FIG. 10 shows a structure of an MRBT AS provided in an embodiment of the present invention.

Furthermore, an MRBT AS is provided in an embodiment of the present invention. The mode applicable to the RBT is a gateway mode. As shown in FIG. 10, the MRBT AS includes:

a receiving unit 101, a judging unit 102, and an adding or putting-through unit 103. The receiving unit 101 is adapted to receive the call request from the MGCF entity when a CS user originates a call to an MRBT subscriber in the IMS. The judging unit 102 is adapted to: judge whether the call request is sent by the MGCF entity, and send a judgment result. The adding or putting-through unit 103 is adapted to: add an RBT service identifier to the sent message that carries early RBT media after receiving a positive judgment result from the judging unit 102, or after receiving an Alerting message from the called party, send a message to the MGCF entity, instructing the MGCF entity to notify the originating MSC server to put through the calling terminal.

It is thus evident that the benefits of the embodiments of the present invention are: The embodiments of the present invention implement RBT interworking between the CS domain and the IMS domain; when a CS user originates a call (video call) to an IMS user, an IMS video RBT may be played to the calling party, thus enhancing the user experience.

In the embodiments of the present invention, the MRBT AS and the MRS are deployed separately as two different network entities. In practice, they may be the same network entity. Moreover, the MRS functionally corresponds to the 3GPP-based Media Resource Function (MRF), which includes a Media Resource Function—Controller Part (MRFC) and a Media Resource Function—Processing Part (MRFP). In practice, the MRBT AS may be combined with the MRFC into the same network entity.

Although the invention has been described through several exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. In a Media Gateway Control Function (MGCF), a Video Interworking Gateway (VIG), or both, of a multimedia communication system, a method for implementing a video Ring Back Tone (RBT) interworking, the method comprising:
    receiving a call request, which originated from a calling terminal of a user in a Circuit Switch (CS) domain, for a session with a called party in an Internet protocol Multimedia Subsystem (IMS) domain, which is a different network from the CS domain;
    based on the received call request from the CS domain, triggering a Multimedia Ring Back Tone (MRBT) service by sending a Session Initiation Protocol (SIP) invite message to an MRBT Application Server (AS) in the IMS domain;
    in response to the SIP invite message, receiving a reply message from the MRBT AS in the IMS domain, wherein the reply message includes information about if an MRBT needs to be played to the calling terminal in the CS domain;
    determining, according to the information in the reply message, that a video RBT in the IMS domain needs to be played at the calling terminal of the user in the CS domain;
    based on the determination, notifying a Mobile Switching Center (MSC) serving the user in the CS domain to put through the calling terminal; and
    thereafter, establishing a communication link with the calling terminal for playing the video RBT in the IMS domain at the calling terminal of the user in the CS domain.

2. The method of claim 1, wherein the MSC is notified to put through the calling terminal by:
    notifying the MSC to put through the calling terminal by sending a Call ProGress (CPG) message or an Alerting message to the MSC.

3. The method of claim 1, wherein the step of determining that the video RBT in the IMS domain needs to be played to the calling terminal in the CS domain is based on video RBT information carried in the reply message.

4. The method of claim 3, wherein if the RBT is in AS mode, the video RBT information comprises video Session Description Protocol (SDP) information in early RBT media.

5. The method of claim 3, wherein if the RBT is in gateway mode, the video RBT information comprises video Session Description Protocol (SDP) information in early RBT media and either an RBT service identifier or an early media header field "P-Early-Media".

6. The method of claim 5, wherein the RBT service identifier comprises an early media service identifier, a service identifier in a message header field, or both.

7. The method of claim 1, wherein if the RBT is in gateway mode, the method further comprises:
    sending a message carrying an RBT service identifier and early RBT media if the MRBT AS determines that the received call request is a video call request from the CS domain.

8. The method of claim 1, wherein the step of determining that the video RBT needs to be played to the calling terminal according includes determining that the message is an instruction of setting up the communication link.

9. The method of claim 8, wherein if the RBT is in gateway mode, the method further comprises:
    sending a message to a Media Gateway Control Function (MGCF) entity, wherein the message instructs the MGCF entity to notify the MSC to put through the calling terminal.

10. The method of claim 7, wherein the determining that the received call request is the video call request from the CS domain is based on the call request carrying a CS video call identifier.

11. A Media Gateway Control Function (MGCF) device, comprising:
    a receiver configured to receiving a call request that originated from a calling terminal of a user in a Circuit Switch (CS) domain for a session with a called party in an Internet protocol Multimedia Subsystem (IMS) domain, which is a different network from the CS domain;
    a Multimedia Ring Back Tone (MRBT) triggering unit, configured to initiate an MRBT service based on the received call request from the calling terminal of the user in the CS domain by sending a Session Initiation Protocol (SIP) invite message to an MRBT Application Server (AS) in the IMS domain;
    a receiving unit, configured to receive a reply message sent by the MRBT AS in response to the SIP invite message, wherein the reply message includes information about if an MRBT needs to be played to the calling terminal of the user in the CS domain;
    a judging unit, configured to judge, according to the reply message received by the receiving unit, whether to play a video Ring Back Tone (RBT) in the IMS domain to the calling terminal of the user in the CS domain;
    a notifying unit, configured to notify a Mobile Switching Center (MSC) serving the calling terminal in the CS domain to put through the calling terminal after receiving a positive judgment result from the judging unit for playing the video RBT in the IMS domain at the calling terminal of the user in the CS domain; and a controlling unit, adapted to control setting up a communication link with the calling terminal in the CS domain for playing the video RBT from the IMS domain.

12. A computer program product comprising computer executable instructions stored on a non-transitory computer readable medium such that when the computer executable instructions are executed by a computer program processor of a multimedia communication system cause a Media Gateway Control Function (MGCF), a Video Interworking Gateway (VIG), or both, to implement a video Ring Back Tone (RBT) interworking that:

receives a call request, which originated from a calling terminal of a user in a Circuit Switch (CS) domain, for a session with a called party in an Internet protocol Multimedia Subsystem (IMS) domain, which is a different network from the CS domain;

based on the received call request from the CS domain, triggers a Multimedia Ring Back Tone (MRBT) service by sending a Session Initiation Protocol (SIP) invite message to an MRBT Application Server (AS) in the IMS domain;

in response to the SIP invite message, receives a reply message from the MRBT AS in the IMS domain, wherein the reply message includes information about if an MRBT needs to be played to the calling terminal in the CS domain;

determines, according to the information in the reply message, that a video RBT in the IMS domain needs to be played at the calling terminal of the user in the CS domain;

based on the determination, notifies a Mobile Switching Center (MSC) serving the user in the CS domain to put through the calling terminal; and thereafter, establishes a communication link with the calling terminal for playing the video RBT in the IMS domain at the calling terminal of the user in the CS domain.

\* \* \* \* \*

UNITED STATES PATENT AND TRADEMARK OFFICE
CERTIFICATE OF CORRECTION

| | | |
|---|---|---|
| PATENT NO. | : 8,553,869 B2 | Page 1 of 1 |
| APPLICATION NO. | : 12/622631 | |
| DATED | : October 8, 2013 | |
| INVENTOR(S) | : Haopeng Zhu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 520 days.

Signed and Sealed this
Thirty-first Day of March, 2015

Michelle K. Lee
*Director of the United States Patent and Trademark Office*